US010467584B2

(12) United States Patent
Lee et al.

(10) Patent No.: US 10,467,584 B2
(45) Date of Patent: Nov. 5, 2019

(54) FOOD INVENTORY SYSTEMS AND METHOD

(71) Applicants: Sun Kyong Lee, Edmonds, WA (US); Youn Ja Lee, Edmonds, WA (US)

(72) Inventors: Sun Kyong Lee, Edmonds, WA (US); Youn Ja Lee, Edmonds, WA (US)

( * ) Notice: Subject to any disclaimer, the term of this patent is extended or adjusted under 35 U.S.C. 154(b) by 856 days.

(21) Appl. No.: 15/005,891

(22) Filed: Jan. 25, 2016

(65) Prior Publication Data

US 2017/0213184 A1 Jul. 27, 2017

(51) Int. Cl.
| | |
|---|---|
| *G06Q 10/08* | (2012.01) |
| *G06Q 10/10* | (2012.01) |
| *H04N 7/18* | (2006.01) |
| *G06K 7/14* | (2006.01) |
| *G06K 7/10* | (2006.01) |
| *G06K 9/00* | (2006.01) |
| *G06K 9/22* | (2006.01) |
| *G06K 9/62* | (2006.01) |

(52) U.S. Cl.
CPC ......... *G06Q 10/087* (2013.01); *G06K 7/1443* (2013.01); *G06Q 10/1093* (2013.01); *H04N 7/18* (2013.01); *G06T 2207/30128* (2013.01)

(58) Field of Classification Search
None
See application file for complete search history.

(56) References Cited

U.S. PATENT DOCUMENTS

| | | | |
|---|---|---|---|
| 6,131,812 A | 10/2000 | Schneider | |
| D449,625 S | 10/2001 | Yu | |
| 7,376,909 B1* | 5/2008 | Coyle | G06Q 10/109 715/778 |
| 7,448,546 B2* | 11/2008 | Jung | G06Q 10/087 235/375 |
| 7,861,542 B2 | 1/2011 | Rozendaal | |
| 7,870,753 B2 | 1/2011 | Marcy et al. | |
| 8,154,857 B2 | 4/2012 | Kendall et al. | |
| 2002/0007486 A1 | 1/2002 | Yun | |
| 2008/0184719 A1 | 8/2008 | Lowenstein | |
| 2010/0187306 A1* | 7/2010 | Solomon | B65G 1/127 235/385 |
| 2013/0151550 A1* | 6/2013 | Lu | G06Q 10/00 707/769 |

(Continued)

FOREIGN PATENT DOCUMENTS

CN 104567262 A 4/2015

*Primary Examiner* — Allen C Chein

(74) *Attorney, Agent, or Firm* — Christopher Mayle; John D. Houvener; Bold IP, PLLC

(57) ABSTRACT

A food inventory system, including a portable device which may include a bar code scanner and camera to add and remove inventory items to and from the inventory. The scanner may be mounted on an inventory storage container to facilitate inventory control from one or more domestic storage devices, including refrigerators, freezers, and pantries. The inventory system may display a table listing the inventory items along with variable details. Based on the food inventory list, the inventory system may suggest recipes, display the ingredients in stock for suggested recipes, and create a shopping list of the ingredients not in stock for a desired recipe. The portable device may be configured with wireless capability, connection to the internet, phones, tablets, laptops, and personal computer.

7 Claims, 14 Drawing Sheets

(56) References Cited

U.S. PATENT DOCUMENTS

| | | | | |
|---|---|---|---|---|
| 2014/0045433 A1* | 2/2014 | Kim | .................... | G06Q 10/087 |
| | | | | 455/66.1 |
| 2015/0059374 A1 | 3/2015 | Hebel | | |
| 2015/0262116 A1* | 9/2015 | Katircioglu | .......... | G06Q 10/087 |
| | | | | 705/28 |
| 2016/0063692 A1* | 3/2016 | Divakaran | ........... | G06K 9/4642 |
| | | | | 382/110 |
| 2017/0109842 A1* | 4/2017 | Byron | .................... | G06Q 50/12 |

* cited by examiner

Fig. 10

| Category | Name | Image | Stored | Expiry Date | Qty | Delete | Edit |
|---|---|---|---|---|---|---|---|
| Miscellaneous | Campbell Chicken noodle soup | | 25 Days ago | 02/22/13 | 1 | ☐ | ☐ |
| Drink | Pepsi Wild Cherry | | 15 Days ago | | 5 | ☐ | ☐ |
| Vegetable | Carrot | | 10 Days ago | | 3 | ☐ | ☐ |
| Fruit | Apple | | 9 Days ago | | 10 | ☐ | ☐ |
| Drink | Snapple Peach Tea | | 7 Days ago | | 1 | ☐ | ☐ |
| Miscellaneous | Spaghetti | | 2 Days ago | | 1 | ☐ | ☐ |
| Drink | Chocolate Milk 1% Gallon | | 1 Day ago | | 1 | ☐ | ☐ |

Main
My Fridge 1 2 3 4 5 >>

Delete   Edit

US 10,467,584 B2

FOOD INVENTORY SYSTEMS AND METHOD

FIELD OF THE DISCLOSURE

This disclosure relates generally to the field of methods and systems for inventory management of foods, beverages, or other items which are commonly stored and consumed in a household.

BACKGROUND

A refrigerator is a standard appliance found in almost every modern home. The technology discussed below falls into the category of inventory management of foods, beverages, or other items which are commonly stored in a household.

For many households, especially families or those with multiple adults living in the same home, the refrigerator, freezer, and pantry can get disorganized and overfull making it hard to know what exactly is or is not in the refrigerator, freezer, or pantry. When people don't know what food items they have, it can lead to people accidentally purchasing duplicate items, forgetting about items on a shopping list or recipe, or allowing perishable foods to rot and become waste.

There have been attempts at solving this food inventory management problem. However, many current attempts are overly complicated and too expensive to install for the majority of homeowners. Other attempts put too much of a time burden on users, so that it becomes inconvenient to manage the food inventory and users lose motivation to keep up with the system. Still others have no way to communicating to users the inventory when they are not at home and are at the store.

SUMMARY

The present invention is fairly simple, and is not overly complicated. It is an electronic device with customized software installed, which can be mounted directly on the door of a refrigerator or on the wall. The device will keep track of food items that go in and out of the refrigerator, multiple fridges, freezers, or pantry by capturing either the bar-code on the food item or the images of the food item.

It may be connected to the home wireless internet (Wi-Fi) so that its inventory information can be communicated and accessed by smart phones, laptops, and other internet connected device remotely.

Because the user can access the food inventory status from the device, the user can make an informed decision on purchasing food items. Redundant food purchases and unnecessary trips to the grocery can be avoided when the device shows exactly what is in the refrigerator.

The device may suggest recipes based on what is in the refrigerator and the time of the day so that the user can better consume food items in one's refrigerator and avoid forgetting them and letting them expire and go to waste. For example, breakfast recipes may be presented in the morning time. The device may suggest recipes when all of the ingredients are present in the inventory system. Alternatively, the device may suggest recipes when some of the ingredients are present in the inventory system and optionally create a shopping list for the ingredients that are not in the inventory system.

In addition, the user can search specific recipes based on the category on the device software. Once the user chooses a specific recipe, the device software may show what food ingredients are in the refrigerator and what food ingredients are missing. In addition, the device may create a shopping list based on what is needed for the recipe. The shopping list may be shared across multiple users. In some examples, the user may desire to check off the list when the ingredients on the shopping list were purchased.

In addition, the user can make a grocery shopping plan by utilizing a calendar function in the device. The calendar function offers memo capability for the user and can be shared across multiple users.

The overall idea is to save money on the food that may have been wasted in the refrigerator, save time by reducing the number of grocery trips, and having fun times cooking in the kitchen by following recipes that are customized by what is in the refrigerator.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 10 is an embodiment of a sub-screen for viewing the list of items in the inventory system.

DETAILED DESCRIPTION

Figure 1:
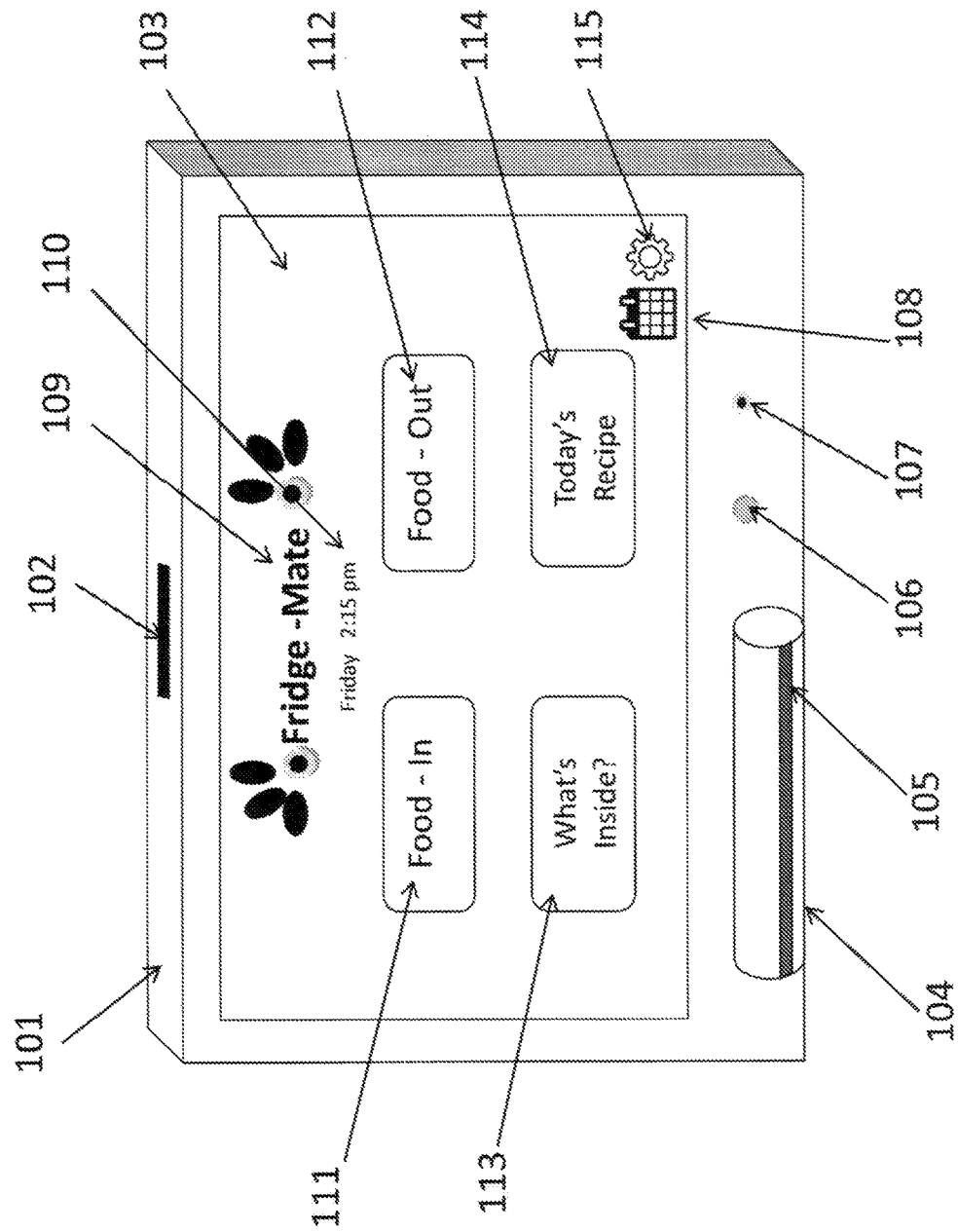
FIG. 1 is an embodiment of the front panel of the electronic device.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Definitions

"Food-In": a main menu option on the main screen to enter items into the inventory system.

"Food-Out": a main menu option on the main screen to remove items from the inventory system.

"Main": a sub-screen option to bring the screen on the device to the main menu.

"Today's Recipe": a main menu option on the main screen to obtain recipe suggestions based on ingredients in the inventory system.

"Use Camera": a sub-screen option to initiate the process of taking an image of an item.

"Use Scanner": a sub-screen option to initiate the process of scanning an item.

"What's Inside?": a main menu option on the main screen to view the inventory list.

The present disclosure is generally drawn, inter alia, to systems, apparatus, and methods therein relating to inventory management of foods, beverages, or other items which are commonly stored and consumed in a household. In the preferred embodiments, a portable device with customized software installed enables users to manage inventory of food items in multiple locations by barcode, image, and manual entries.

In some embodiments, the device has a touch screen the front facing the user and several components integrated perform food inventory management. The device is operated by custom software and the power is supplied by an internal, rechargeable battery. The battery may be charged by plugging the device into a charging station.

In some embodiments, the device may be configured to manage inventory in multiple locations, such as multiple refrigerators, freezers, and pantry.

FIG. 1 is an embodiment of the front panel of the electronic device. FIG. 1 includes a hard cover case 101, a charging slot 102, a screen 103, a bar code reader 104, a bar code scanner window 105, a camera lens 106, a camera sensor 107, a graphic calendar icon 108, a brand name and logo 109, a date and clock time 110, a graphic "Food-In" button 111, a graphic "Food-Out" button 112, a graphic "What's Inside" button 113, a graphic "Today's Recipe" button 114, and a graphic user settings button 115. In FIG. 1, hard cover case 101 is preferably made out of hard material like plastic to protect the device from damage. Charging slot 102 is a slot for the universal serial bus (USB) pin in the charging station, shown in FIGS. 3 and 4, to charge the device and update software.

In FIG. 1, screen 103 is a touch-screen made of glass, plastic, or other commonly used touch-screen surface. Screen 103 may be back-lit by LCD, LED, Plasma, or other commonly used screen lighting technology. Screen 103 may be attached to and removable from hard cover case 101. Bar code reader 104, located on the bottom left of the device, is a bar code reader component that may be angle adjustable by rotating the angle of bar code scanner window 105. To the right of bar code reader 104 is camera lens 106. Camera lens 106 may be used for capturing images of food to inventory food items. To the right of camera lens 106 is camera sensor 107. Camera sensor 107 senses items placed within camera range, preferably up to 10 inches away from camera sensor 107, and activates camera lens 106 when an item in range is detected. The device uses bar code reader 104 and image recognition application program interface (API) to recognize food items when the user scans the item or camera lens 106 captures an image of the item before placing it in the inventory, such as a refrigerator or pantry. Speed of processing time can vary based on dependant variables, such as the home Wi-Fi network band speed, home internet connection speed, and bar code and image recognition speed. The device may download the bar code database of food items to reduce the overhead time of the internet speed. However, periodic database updates may be required.

In FIG. 1, the home screen preferably shows the brand name and logo 109 at the top center of screen 103. Just below brand name and logo 109 is day and time 110, which displays the current day of the week and time. The home screen also shows one or more menu options, "Food-In" button 111, "Food-Out" button 112, "What's Inside?" button 113, "Today's Recipe" button 114, graphic calendar icon 108, and graphic user settings button 115.

In FIG. 1, graphic "Food-In" button 111 is used to enter food items into the inventory system. The graphic "Food-Out" button 112 is used to remove food items from the inventory system. The graphic "What's Inside?" button 113 is used to view a list of inventory items with various details. The graphic "Today's Recipe" button 114 is used to get recipe suggestions based on the contents in the inventory system and to create shopping lists. Graphic calendar icon button 108 is used to enter or view memos for a specific calendar date. The home screen menu items are discussed in further detail in subsequent figures.

In FIG. 1, user settings button 113 allows a user to set a current time, connect to home Wifi, turn off API service(s), adjust backlit brightness, add users, and set administrative security password.

Figure 2:
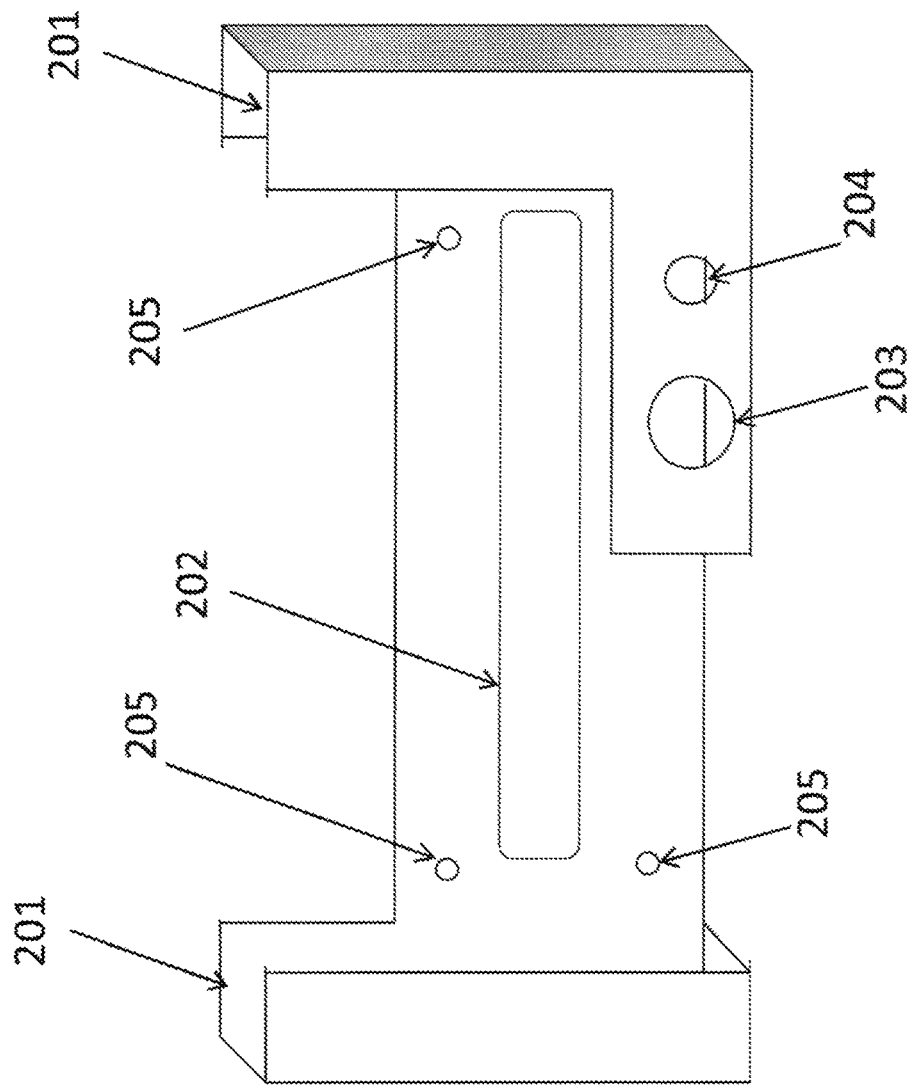
FIG. 2 is an embodiment of the mounting bracket for the electronic device.

FIG. 2 is an embodiment of the mounting bracket for the electronic device. FIG. 2 includes a mounting bracket 201, a mounting pad 202, a camera lens hole 203, a camera sensor hole 204, and wall mounting holes 205. In FIG. 2, mounting bracket 201 may be made of hard material comprising plastic and metal. Mounting bracket 201 may be attached to a door of a refrigerator, a wall or other hard surface where the device may be frequently accessed. Behind mounting bracket 201 is mounting pad 202, which may be configured to be a sticky patch or magnet that may adhere to a desired hard surface location and hold the weight capacity of at least five pounds. Alternatively, mounting pad 202 may be configured with a hook or some sort of hanging system to secure onto a desired location. In addition, mounting holes 205 located on the back part of mounting bracket 201 may be used to attach mounting bracket 201 to a surface with screws. The device may easily slide in and out of mounting bracket 201 for easy access. Camera lens hole 203 is a hole in mounting bracket 201 to allow camera lens 106 on the device to see through and take images of food items. Camera sensor hole 204 is a hole in mounting bracket 201 to allow camera sensor 107 on the device to see through and sense food items.

Figure 3:
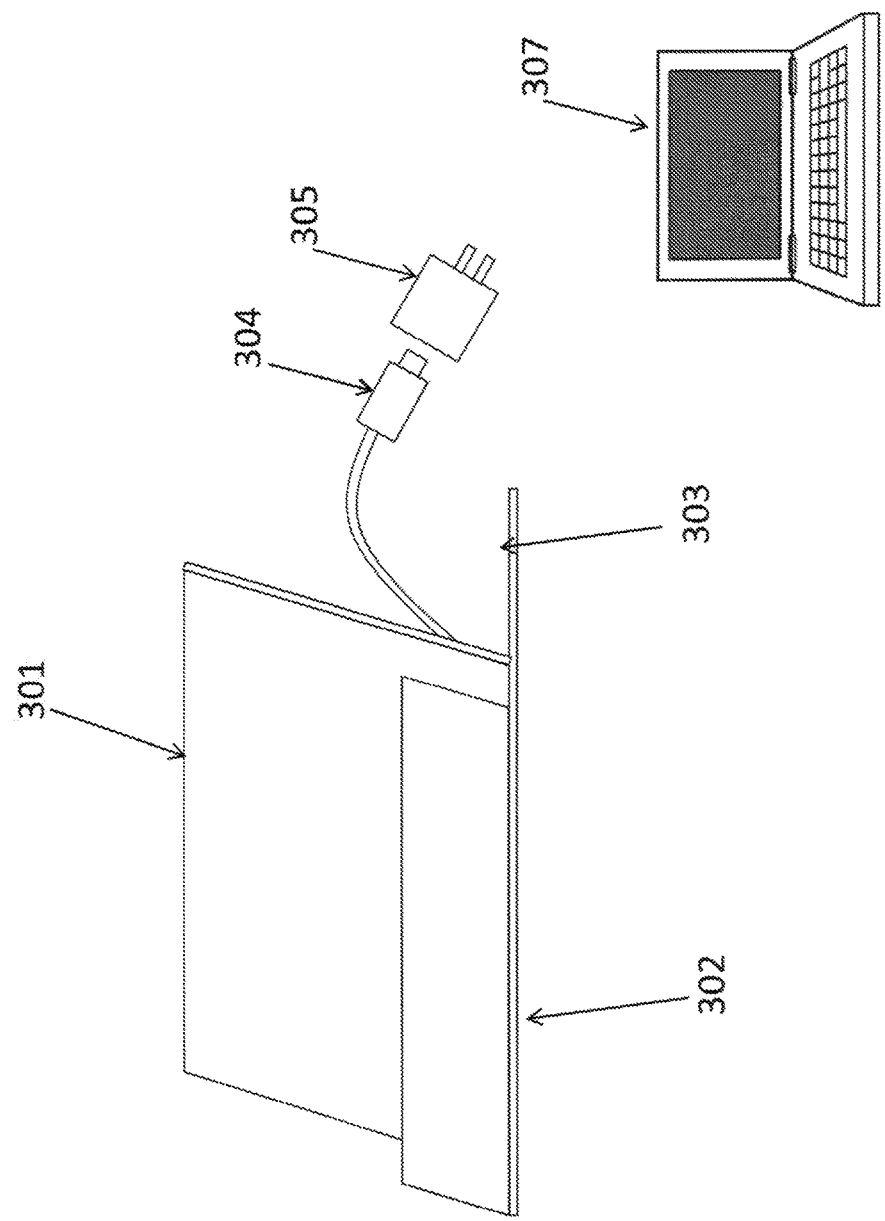
FIG. 3 is an embodiment of the charging station for the electronic device.

FIG. 3 is an embodiment of the charging station for the electronic device. FIG. 3 includes a back-board 301, a front-board 302, a base-board 303, a universal serial bus (USB) connector 304, a wall charger 305, and a computing device 307. In FIG. 3 is a charging station for the device shown in FIG. 1. The charging station may be placed on a table or countertop near an outlet to charge the device. The device may be operable while connected to the charging station. Back-board 301 may be configured to allow the device to slide in to the charging station and allow the device to lean against back-board 301 while charging. Front-board 302 assists in securing the device in place by covering some portion of the device. Base-board 303 may be configured to stabilize the entire charging station to be upright, including the device while charging. Base-board 303 may also be configured to prevent the charging station from falling backwards.

In FIG. 3, USB connector 304 is a serial port connection for charging and updating software for the device. USB connector 304 may be directly plugged into computing device 307 for software updates and recharging the internal battery. USB connector 304 may also be directly plugged in to wall charger 305. Wall charger 305 may be configured to connect to a USB connector on one side and an electrical outlet on another side. Wall charger 305 may be configured to be a 120 volt or 240 volt outlet charger.

Figure 4:
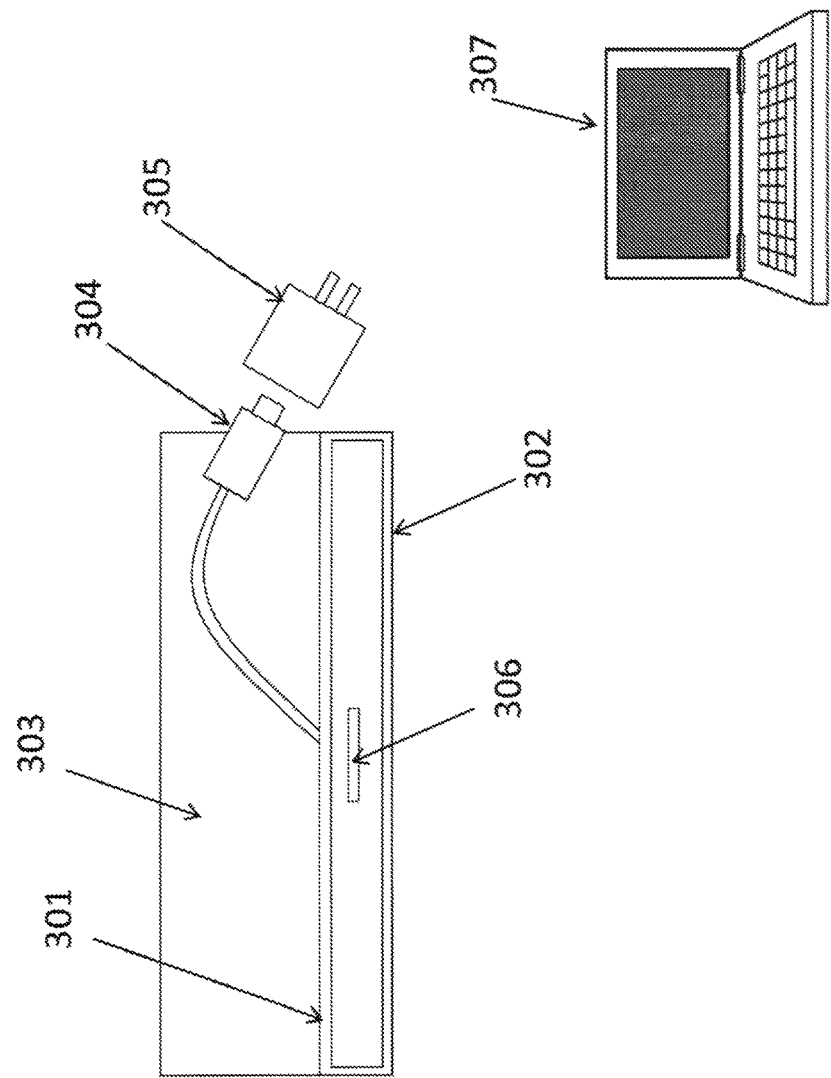
FIG. 4 is a top-view embodiment of the charging station for the electronic device.

FIG. 4 is a top-view embodiment of the charging station for the electronic device. FIG. 4 includes a back-board 301, a front-board 302, a base-board 303, a USB connector 304, an electrical plug 305, a multi-pin USB plug 306, and a computing device 307. In FIG. 4, back-board 301, front-board 302, base-board 303, USB connector 304, and electrical plug 305 function as described above in FIG. 3. Multi-pin USB plug 306 plugs into charging slot 102 in FIG. 1 to charge the device and update software from computing device 307.

Figure 5:
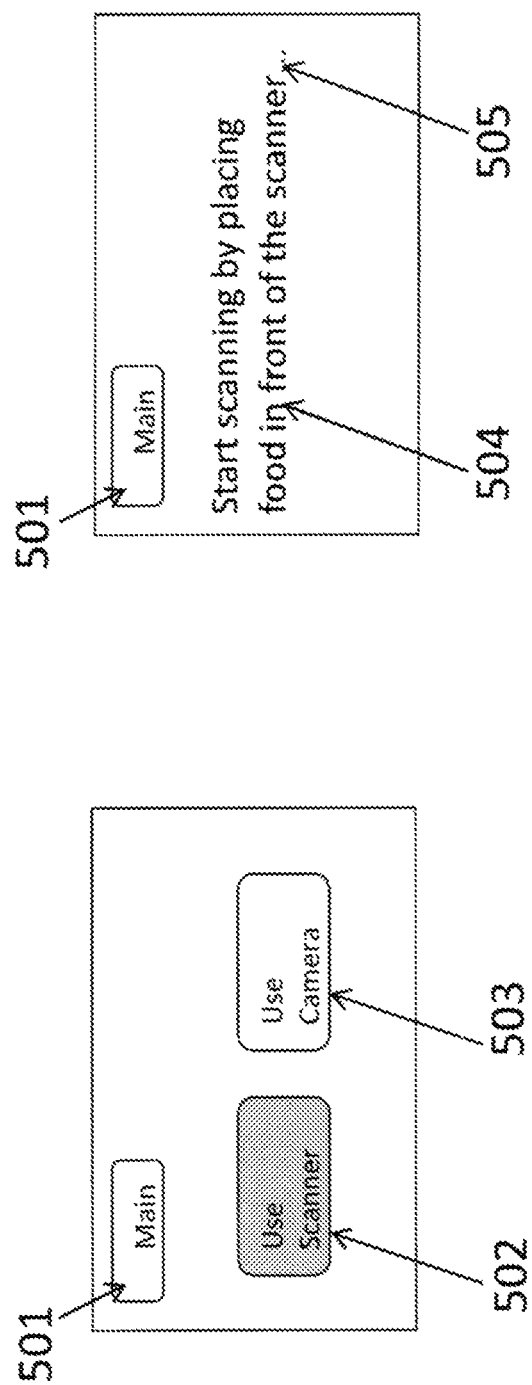
FIG. 5 is an embodiment of sub-screens for entering food items in the inventory system by scanner.

FIG. 5 is an embodiment of sub-screens for entering food items in the inventory system by scanner. FIG. 5 includes a graphic "Main" button 501, a graphic "Use Scanner" button 502, a graphic "Use Camera" button 503, a set of instructions 504, and a set of blinking ellipses 505. In FIG. 5, two sub-screens are shown. The sub-screen on the left appears when "Food-In" button 109 is selected. The sub-screen on the right appears when "Use Scanner" button 502 is selected. Graphic "Main" button 501 may be selected at any time to return to the main screen shown in FIG. 1. Set of instructions 504 instructs the user to scan a food item by placing the item in front of the scanner. Blinking ellipses 505 appears to indicate to the user that bar code scanner 104 has been activated and ready to scan an item. After a food item has been scanned, the software program in the device searches the Barcode Database to recognize the product. The device may be configured to search through a downloaded database within the device or it may search through a barcode database API over the internet. After the device has scanned the item and searched a barcode database, screens shown in FIG. 6 appear.

Figure 6:
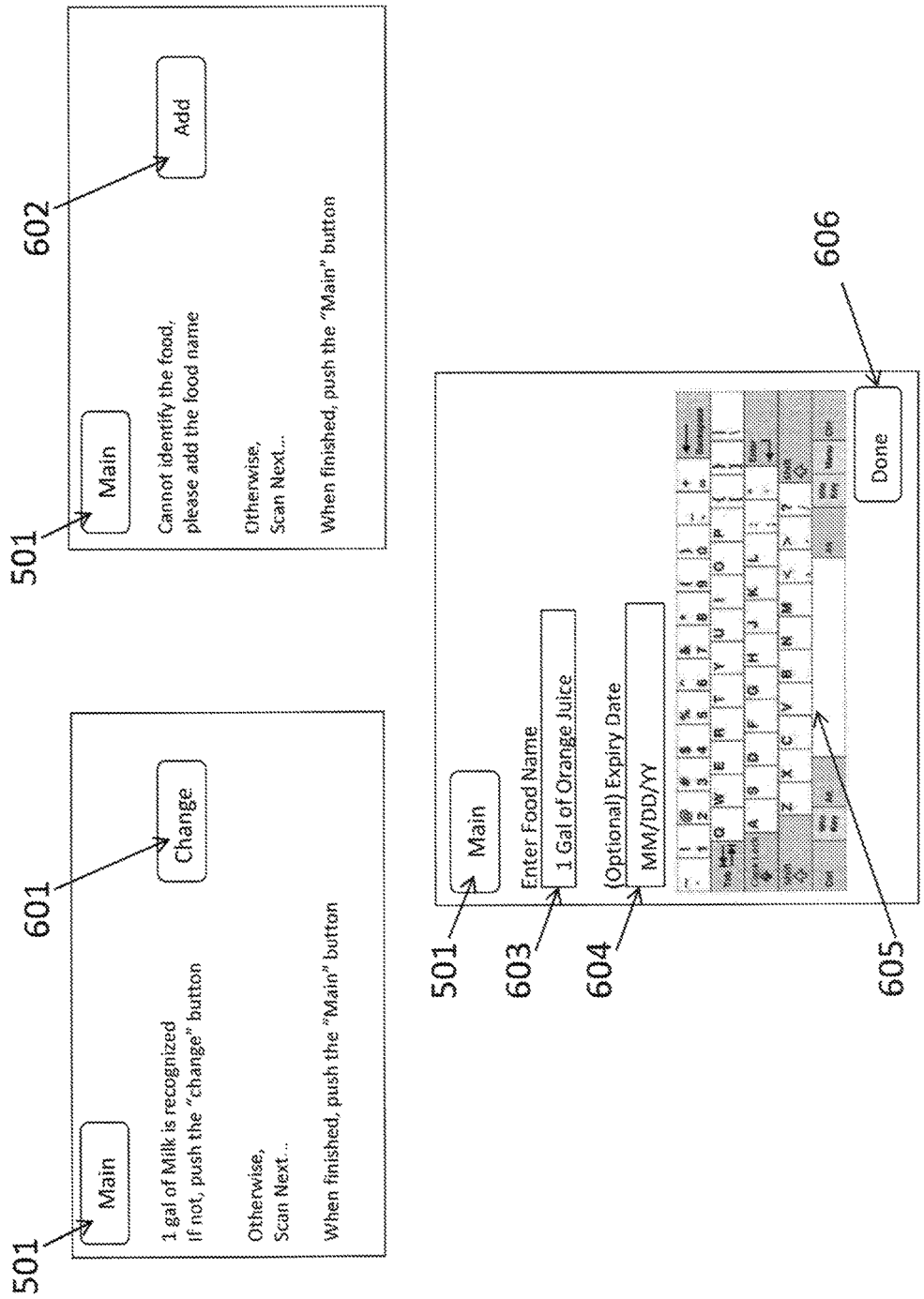
FIG. 6 is an embodiment of additional sub-screens for entering food items in the inventory system by scanner.

FIG. 6 is an embodiment of additional sub-screens for entering food items in the inventory system by scanner. FIG. 6 includes a graphic "Main" button 501, a graphic "Change" button 601, a graphic "Add" button 602, a graphic text box 603, a graphic text box 604, a graphic alphanumeric keyboard 605, and a graphic "Done" button 606. In FIG. 6, additional sub-screens for entering food items in the inventory system by scanner are shown. The two upper sub-screens are the two sub-screens, one or the other, that appear after the device has scanned an item and searched a barcode database. The sub-screen on the left is shown when the scanned item is recognized and gives the user an opportunity to make changes via graphic "Change" button 601. The sub-screen on the right is shown when the scanned item is not recognized and gives the user an opportunity to add the item manually via graphic "Add" button 602. Graphic "Main" button 501 may be selected at any time to return to the main screen shown in FIG. 1.

When the graphic "Change" button 601 or "Add" button 602 is selected, the sub-screen displayed on the bottom appears. This screen allows the user to enter the food name in text box 603 and optionally the expiration date in text box 604 by using alphanumeric keyboard 605. When the graphic "Done" button 606, located on the bottom right is selected, the device saves the entered information in the device's database along with a time stamp and returns to the scanning screen shown in FIG. 5; the right sub-screen of the two shown. Graphic "Main" button 501 may be selected at any time to return to the main screen shown in FIG. 1.

Figure 7:
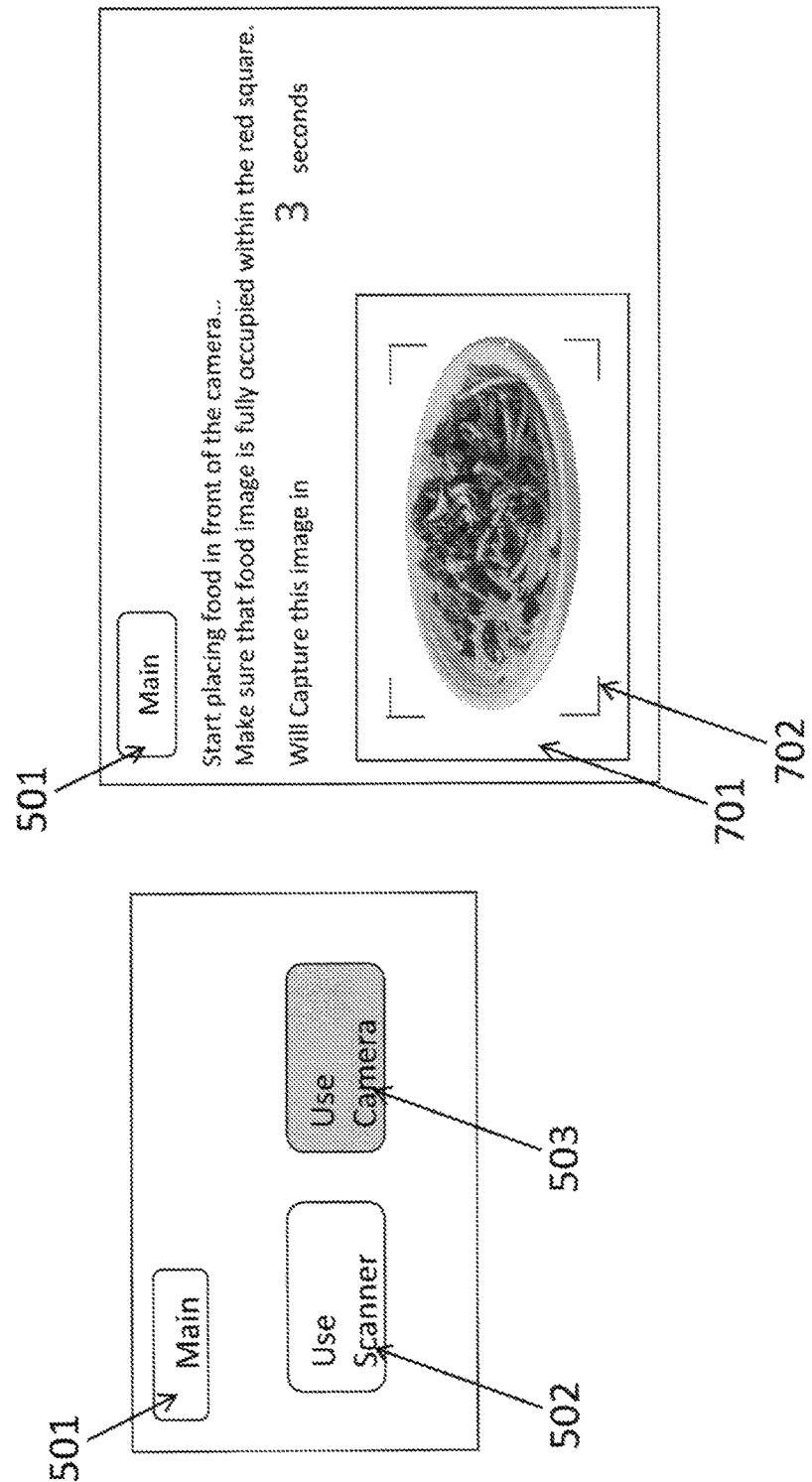
FIG. 7 is an embodiment of sub-screens for entering food items in the inventory system by camera.

FIG. 7 is an embodiment of sub-screens for entering food items in the inventory system by camera. FIG. 7 includes a graphic "Main" button 501, a graphic "Use Scanner" button 502, a graphic "Use Camera" button 503, a graphic picture box 701, and a graphic red box 702. In FIG. 7, two sub-screens are shown. The sub-screen on the left appears when "Food-In" button 109 is selected. The sub-screen on the right appears when "Use Camera" button 503 is selected. When the screen on the right appears, the device instructs the user to place the food item in front of the camera and to adjust the location of the food so that the image the camera captures in graphic picture box 701 fits within the graphic red box 702. Once the image of the food item fully occupies the graphic red box 702, an automatic count-down initiates and the camera captures an image. The device then uses software to recognize the food item by using image recognition API. The device may be configured to allow the user to disable the image recognition API to cut the additional recognition time, which prompts the device to simply put the image in the device's database with the time stamp. Graphic "Main" button 501 may be selected at any time to return to the main screen shown in FIG. 1.

Figure 8:
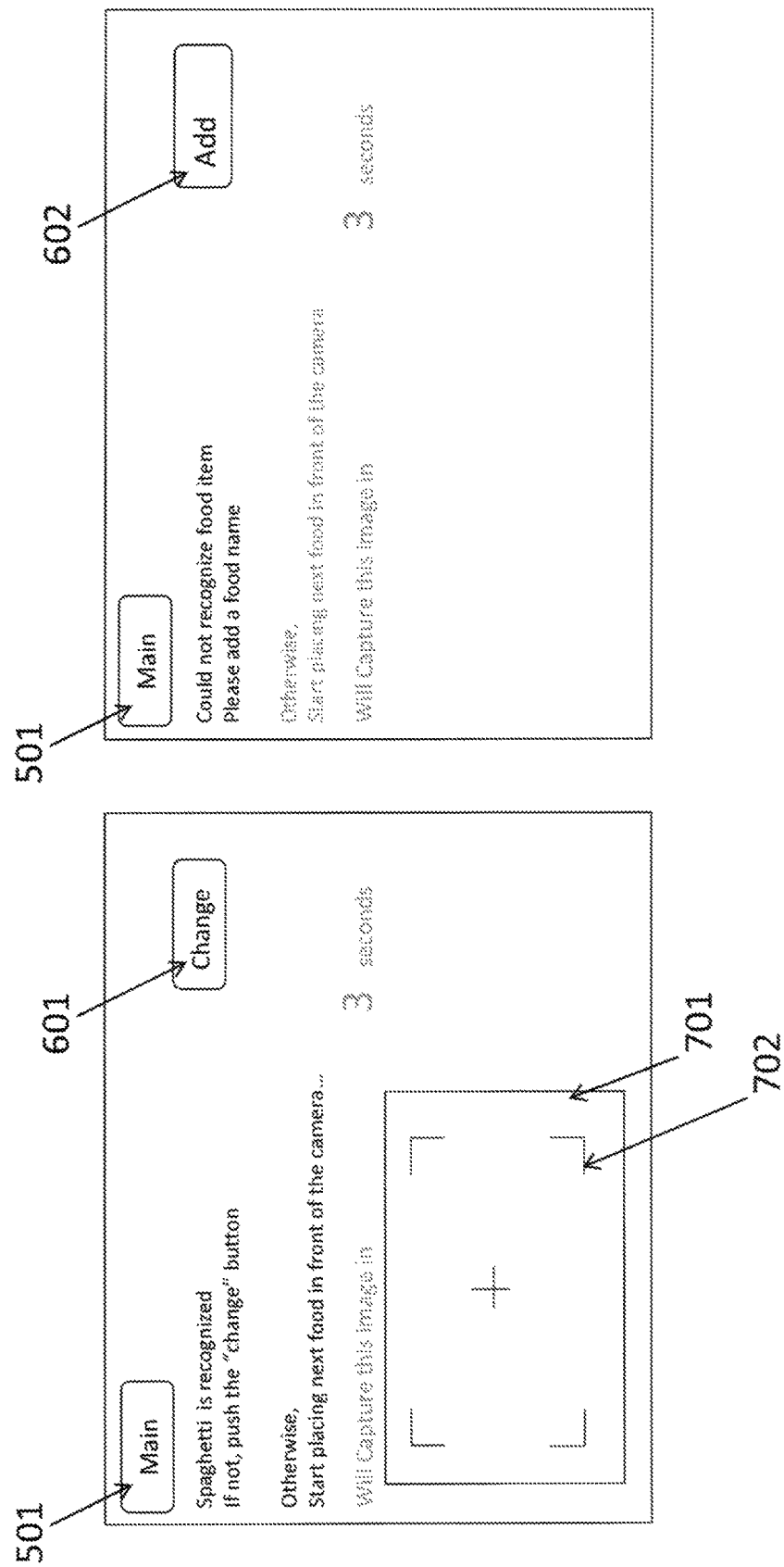
FIG. 8 is an embodiment of additional sub-screens for entering food items in the inventory system by camera.

FIG. 8 is an embodiment of additional sub-screens for entering food items in the inventory system by camera. FIG. 8 includes a graphic "Main" button 501, a graphic "Change" button 601, a graphic "Add" button 602, a graphic picture box 701, and a graphic red box 702. In FIG. 8, additional sub-screens for entering food items in the inventory system by camera are shown. The two sub-screens are the two sub-screens, one or the other, that appear after the device has captured an image of the food item. The sub-screen on the left is shown when the image of the item is recognized and gives the user an opportunity to make changes via graphic "Change" button 601. Additionally, the user is prompted to place the next food item in front of the camera and repeat the process to enter a food item into the inventory by camera. The sub-screen on the right is shown when the image of the item is not recognized and gives the user an opportunity to add the item manually via graphic "Add" button 602. When the graphic "Change" button 601 or graphic "Add" button 602 are selected, a sub-screen similar to the one in the bottom of FIG. 6 appears and the information is inputted accordingly. Graphic "Main" button 501 may be selected at any time to return to the main screen shown in FIG. 1.

Figure 9:
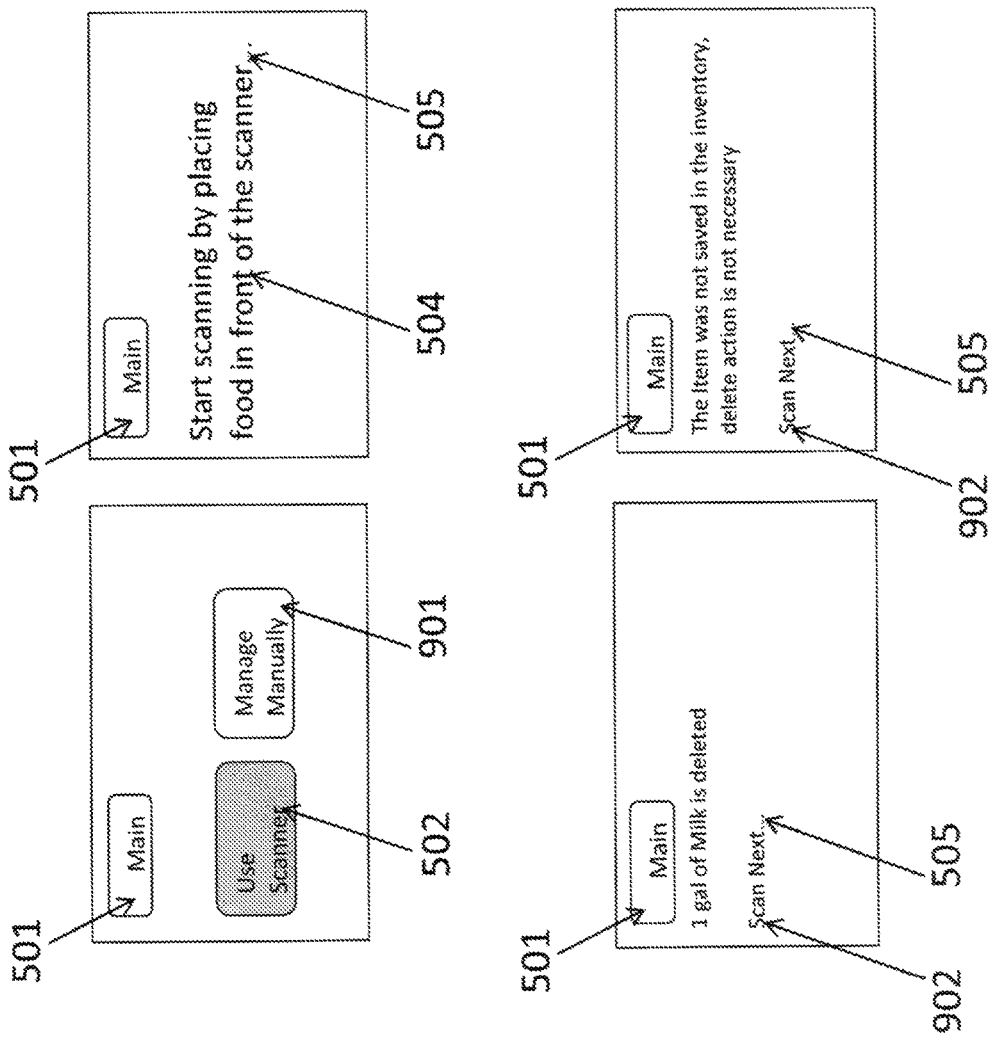
FIG. 9 is an embodiment of sub-screens for removing food items from the inventory system by scanner.

FIG. 9 is an embodiment of sub-screens for removing food items from the inventory system by scanner. FIG. 9 includes a graphic "Main" button 501, a graphic "Use Scanner" button 502, a graphic "Manage Manually" button 901, a set of instructions 504, a set of blinking ellipses 505, and a set of instructions 902. The sub-screen on the upper left appears when "Food-Out" button 110 is selected. The sub-screen on the upper right appears when "Use Scanner" button 502 is selected. Graphic "Main" button 501 may be selected at any time to return to the main screen shown in FIG. 1. Set of instructions 504 instructs the user to scan a food item by placing the item in front of the scanner. Blinking ellipses 505 appears to indicate to the user that bar code scanner 104 has been activated and ready to scan an item. After a food item has been scanned, the software program in the device searches the Barcode Database within the device to recognize the product. After the device has scanned the item and searched the barcode database, one of the bottom two sub-screens appear.

The sub-screen on the bottom left appears if the item is recognized, the device deletes the item from its records, and prompts the user with the next instruction 902 to scan the next item to remove from its inventory list. The sub-screen on the bottom right appears if the item was not recognized, nothing happens to the inventory list, and the user is prompted to scan the next item via instructions 902. Selecting the graphic "Manage Manually" button 901 results in the same process as described for selecting graphic "What's Inside?" button 111 shown on the main screen in FIG. 1. Graphic "Main" button 501 may be selected at any time to return to the main screen shown in FIG. 1.

FIG. 10 is an embodiment of a sub-screen for viewing the list of items in the inventory system. FIG. 10 includes a graphic "Main" button 501, a sorting arrow 1001, a check box 1002, a check box 1003, a check box 1004, a check box 1005, a set of page numbers 1006, a graphic "Delete" button 1007, and a graphic "Edit" button 1008. In FIG. 10, the sub-screen shown appears when a user selects the graphic "What's Inside" button 111 on the main screen shown in FIG. 1. The sub-screen shows a table listing the inventory items along with variable details that may be sorted by storage date by selecting sorting arrow 1001. Some of the details displayed include category type, name of the food item, number of days the item was stored, the expiration date, and quantity of items. Page numbers 1006 allows the user to jump to different parts of the inventory list. Check box 1002 allows the user to select all of the check boxes in the "Delete" column for removal from the inventory list. Check box 1003 allows the user to select all of the check boxes in the "Edit" column for detail modification. Selecting graphic "Delete" button 1007 removes the items with checked boxes from the inventory list. Selecting graphic "Edit" button 1008 allows the user to modify the details of the items with checked boxes. For example, to remove apples from the inventory list, check box 1004 would be checked and then graphic "Delete" button 1007 would be selected to finalize removal of apples from the inventory list. To modify the details for apples, check box 1005 would be checked and then graphic "Edit" button 1008 would be selected to edit the details, which is discussed in further detail in the next figure.

Figure 11:
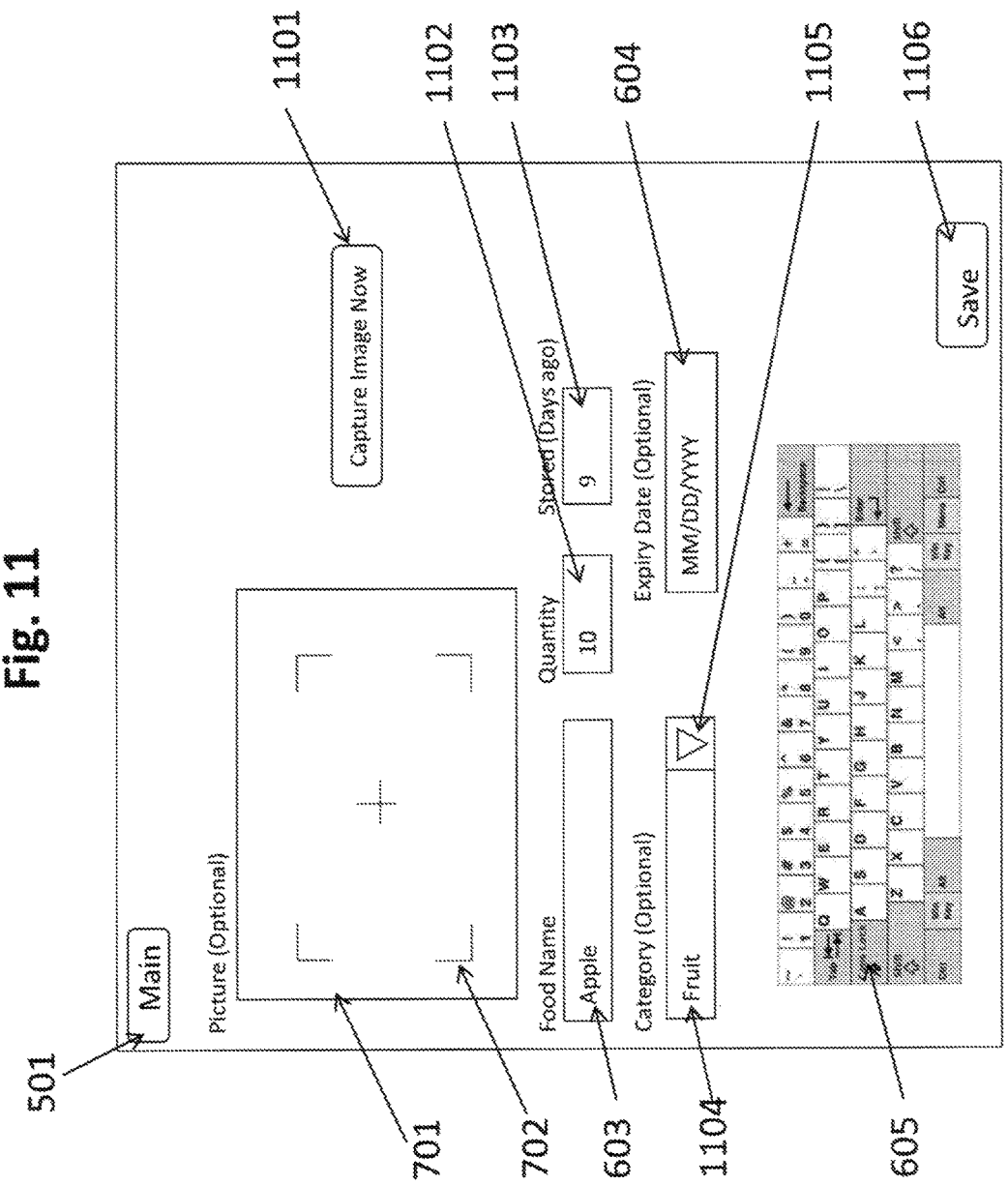
FIG. 11 is an embodiment of a sub-screen for editing the details of an item in the inventory system.

FIG. 11 is an embodiment of a sub-screen for editing the details of an item in the inventory system. FIG. 11 includes a graphic "Main" button 501, a graphic picture box 701, a graphic red box 702, a graphic text box 603, a graphic text box 604, a graphic alphanumeric keyboard 605, a graphic "Capture Image Now" button 1101, a graphic text box 1102, a graphic text box 1103, a graphic text box 1104, a drop-down arrow 1105, and a graphic "Save" button 1106. In FIG. 11, a sub-screen to modify the details of a food item is shown. Picture box 701 and red box 702 allow the user to capture an image for the food item when graphic "Capture Image Now" button 1101 is selected. The user may modify the food name in text box 603, the quantity of the food items in text box 1102, the number of days the food item has been stored in text box 1103, the category of the food item in text box 1104, and the expiration date of the food item in text box 604. For example, the category of the food item may be selected using drop-down arrow 1105 to select "Fruit" for text box 1104. As another example, the quantity of the item may be lowered by a value of one by using alphanumeric keyboard 605. Selecting graphic "Save" button 1106 will save the data modified and entered. Graphic "Main" button 501 may be selected at any time to return to the main screen shown in FIG. 1.

Figure 12:
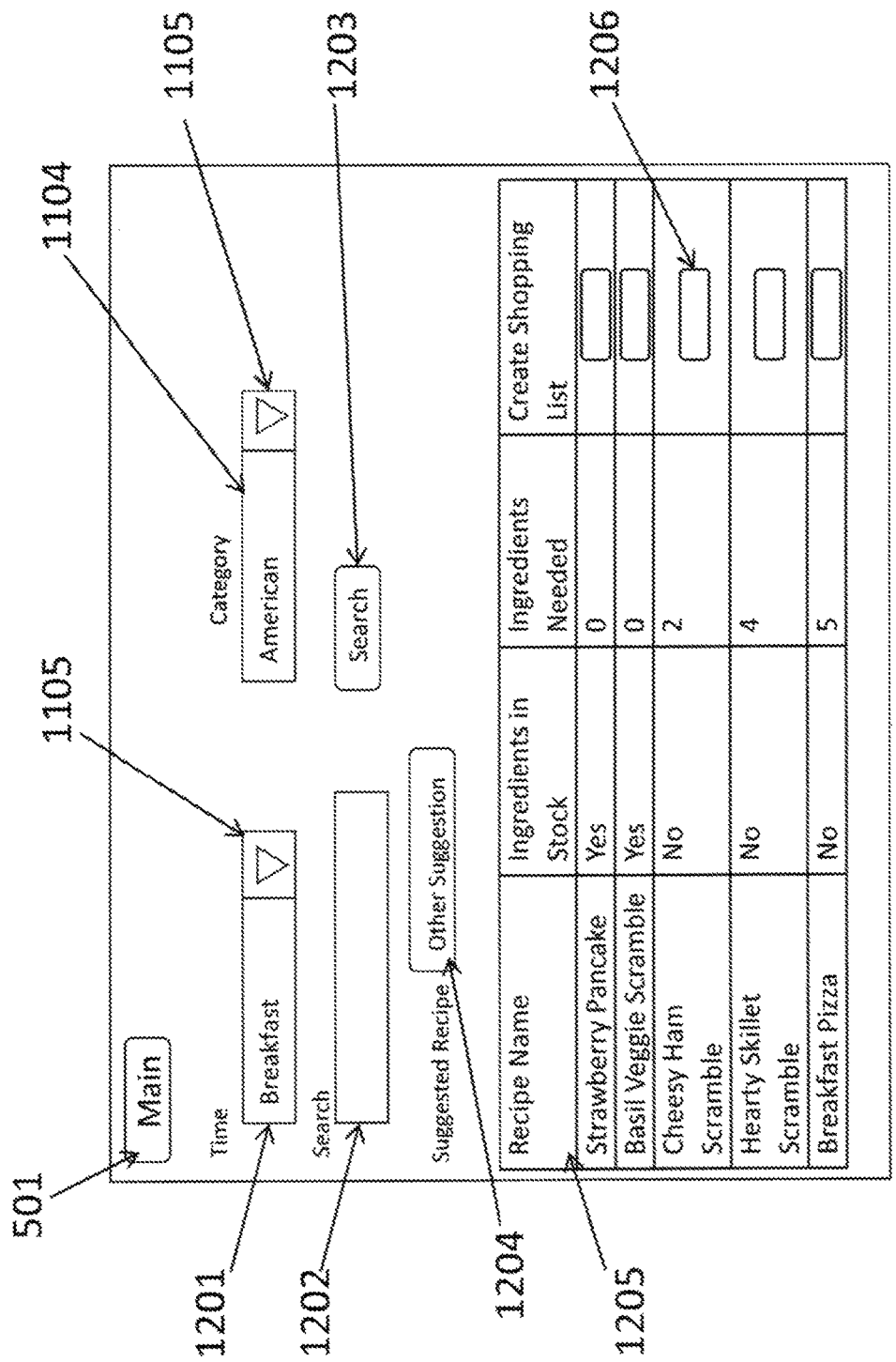
FIG. 12 is an embodiment of a sub-screen for recipe suggestions and creating shopping lists.

FIG. 12 is an embodiment of a sub-screen for recipe suggestions and creating shopping lists. FIG. 12 includes a graphic "Main" button 501, a graphic text box 1104, a drop-down arrow 1105, a graphic text box 1201, a graphic text box 1202, a graphic "Search" button 1203, a graphic "Other Suggestion" button 1204, a recipe table 1205, and a check box 1206. In FIG. 12, the sub-screen shown appears when a user selects the graphic "Today's Recipe" button 112 on the main screen shown in FIG. 1. The sub-screen shows a table listing suggested recipes based on the inventory list. The user may select search parameters such as time of day in text box 1201 by selecting drop-down arrow 1105. Other search parameters include category of recipe in text box 1104 and specific terms in text box 1202. Recipe ideas may be suggested by selecting graphic "Other Suggestion" button 1204. Recipe table 1205 may be configured to show the recipe name, whether all of the ingredients are in stock, and the number of ingredients that are needed. A user may select a check box in the "Create Shopping List" column to generate a shopping list of items needed for a certain recipe. For example, a user may desire to make "Cheesy Ham Scramble" and selects check box 1206 for the two ingredients that are needed to follow the recipe. The software may be configured to allow the user to do this with the device at home or with mobile device software on the go or at the store. Graphic "Main" button 501 may be selected at any time to return to the main screen shown in FIG. 1.

Figure 13:
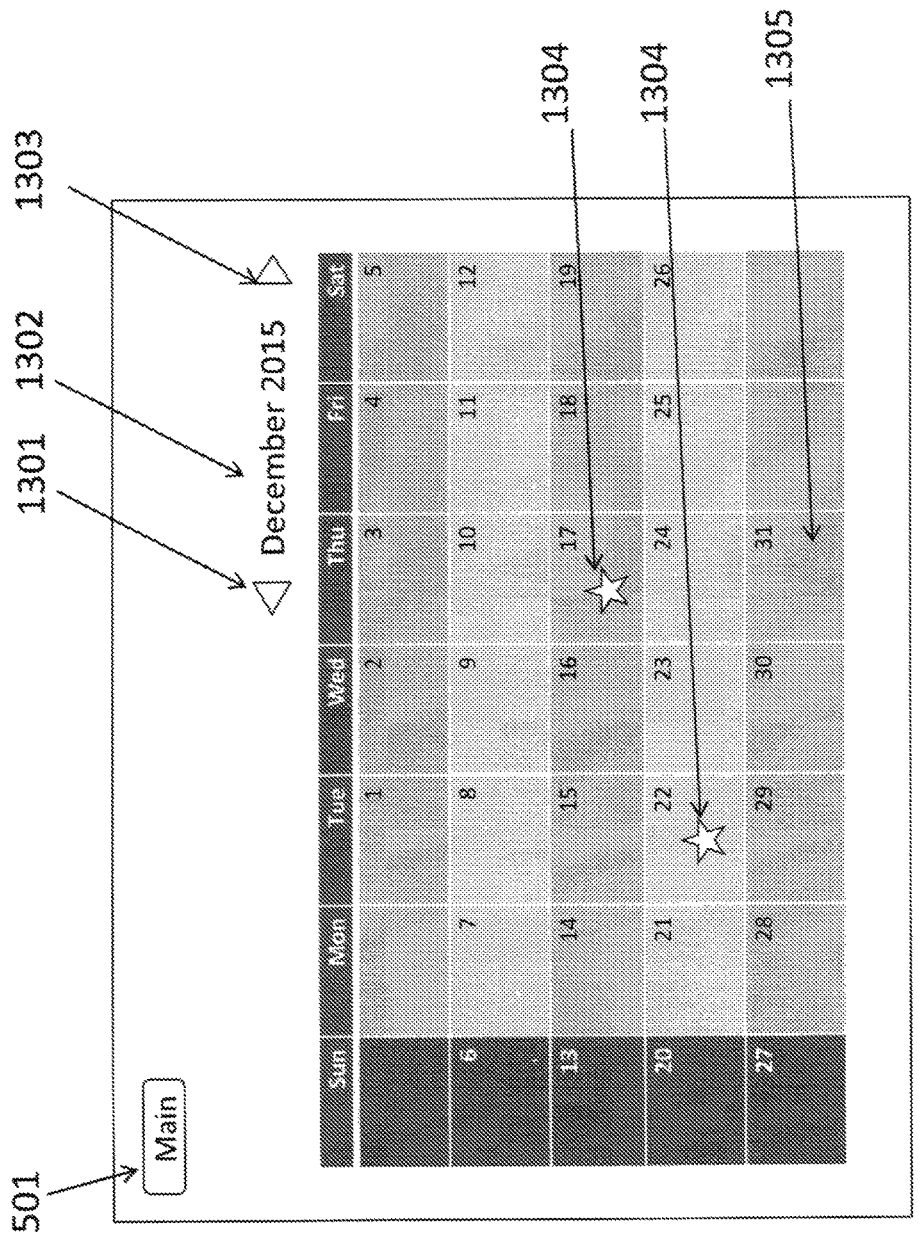
FIG. 13 is an embodiment of a sub-screen for a calendar with memo capability.
Figure 14:
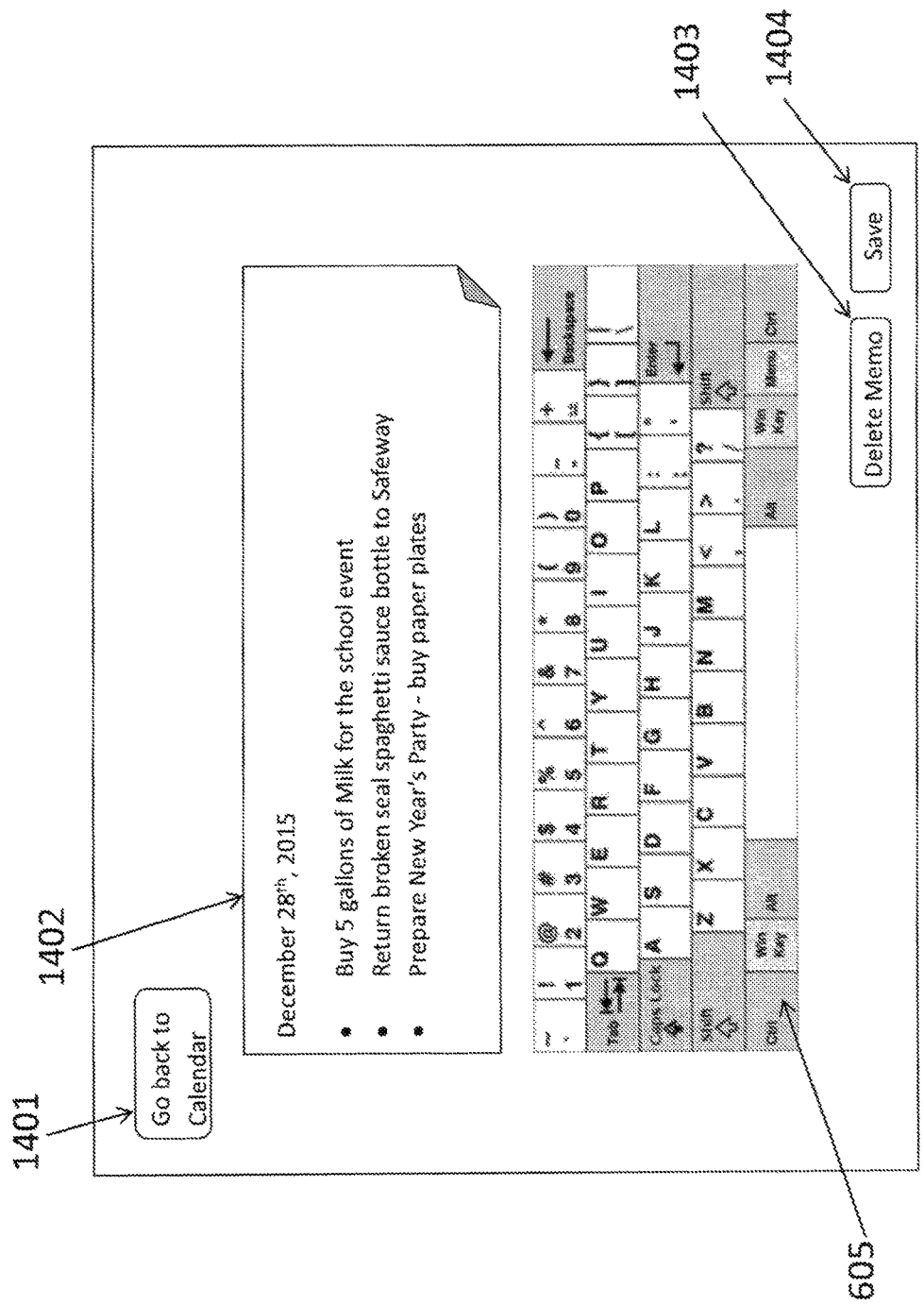
FIG. 14 is an embodiment of a sub-screen for a calendar memo.

FIG. 13 is an embodiment of a sub-screen for a calendar with memo capability. FIG. 13 includes a graphic "Main" button 501, a graphic left-pointing triangle button 1301, a current month and year 1302, a graphic right-pointing triangle button 1303, a graphic star button 1304, and a graphic calendar box 1305. In FIG. 13, a user may select graphic left-pointing triangle button 1301 to view a previous month. A user may view the next month by selecting graphic right-pointing triangle button 1303. Between the two graphic triangle images is displayed the current month and year 1302 displayed on the sub-screen at the moment. A user may select any calendar date box within the graphic calendar box to add a memo, such as graphic calendar box 1305. When a calendar box is selected, a sub-screen will be displayed as shown in FIG. 14. A calendar date box that has a memo will display graphic star button 1304, such as on calendar date boxes 17 and 22. Graphic "Main" button 501 may be selected at any time to return to the main screen shown in FIG. 1.

FIG. 14 is an embodiment of a sub-screen for a calendar memo. FIG. 14 includes a graphic "Go back to Calendar" button 1401, a text box 1402, a graphic alphanumeric keyboard 605, a graphic "Delete Memo" button 1403, and a graphic "Save" button 1404. In FIG. 14, a sub-screen for entering memos for a specific date is shown after selecting a calendar box as discussed in FIG. 13. A user may type a memo using graphic alphanumeric keyboard 605, wherein the text would be configured to appear in text box 1402. The memo in text box 1402 may be deleted by selecting graphic "Delete Memo" button 1403. The memo in text box 1402 may be saved by selecting graphic "Save" button 1404. A user may go back to the calendar by selecting graphic "Go back to Calendar" button 1401.

While preferred and alternate embodiments have been illustrated and described, as noted above, many changes can be made without departing from the spirit and scope of the Food Inventory Device. Accordingly, the scope of the Food Inventory Device is not limited by the disclosure of these preferred and alternate embodiments. Instead, the scope of the Food Inventory Device should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶116. In particular, the use of "step of" in the claims herein is not intended to invoke the provisions of U.S.C. § 112 ¶116.

What is claimed is:

1. A food inventory system comprising:
   one or more databases, the databases stored in a memory, wherein at least one database is an inventory database, the inventory database comprising one or more inventory items placed in a storage container,
   one or more processors coupled to the one or more databases;
   at least one computing device coupled to the one or more processors and the one or more databases; the computing device comprising a bar code reader, the bar code reader configured to capture identifying information of the one or more inventory items, wherein the identifying information of the one or more inventory items is searched in a barcode database stored in the memory to recognize the one or more inventory items, a camera having a camera lens, the camera configured to capture identifying information of the inventory items, wherein the identifying information of the one or more inventory items is searched using an image recognition API stored in the memory to recognize the one or more inventory items whose identifying information has been captured by the camera, a camera sensor configured to sense the one or more inventory items placed within a predetermined range of camera, the camera sensor configured to activate the camera lens when the one or more inventory items in range, wherein the camera sensors when activated captures identifying information of the one or more inventory items in range, a cover case configured to protectthe computing device, and a touch screen, the touch screen configured to display the user interface and allow a user to interact with a user interface; wherein the one or more processors are configured to:
   updating the inventory database with one or more of the one or more inventory items by capturing identifying information of the one or more inventory items being placed in the storage container;
   updating the inventory database by capturing identifying information of the one or more inventory items being removed from the storage container; and
   presenting the user interface on the computing device, wherein the user interface comprises a display of a listing of the one or more inventory items in the storage container from the inventory database along with variable details; the one or more inventory items in the storage container, sortable by details, comprising storage date, category type, name of the one or more inventory items in the storage container, number of days the one or more inventory items have been stored in the storage container, expiration date of the one or more inventory items in the storage container, and quantity of the one or more inventory items in the storage container; and
   a mounting bracket, the mounting bracket configured to couple the storage container to the computing device, the mounting bracket configured to allow computing device to slide in and out of the mounting bracket, the mounting bracket further comprising a first hole in mounting bracket configured to allow camera lens on the computing device to see through and take images of inventory items and a second hole in the mounting bracket configured to allow camera sensor on computing device to see through and sense the one or more inventory items.

2. The food inventory system of claim 1, the mounting bracket having a mounting pad, in the form of magnet or sticky pad configured to allow the mounting bracket to be adherable to the storage container.

3. The food inventory system of claim 2, the user interface allowing the one or more inventory items listed in the inventory database to be deleted and the details of the one or more inventory items to be edited.

4. The food inventory system of claim 3, the user interface further comprising a calendar, the user interface allowing user to add a memo to the calendar.

5. The food inventory system of claim 4, wherein the processors are further configured to:
- presenting, through the user interface, the recipe name, whether all of the one or more inventory items that makeup the recipe are in the inventory database, and the number of the one or more inventory items that are needed in the one or more recipes, wherein the suggested recipes are searchable by parameters comprising time of day, category of the one or more recipes, and specific terms.

6. The food inventory system of claim 5, wherein the processors are further configured to:
- generating a shopping list of the one or more inventory items needed for the one or more recipes as determined by the one or more inventory items not found in the inventory database;
- transmitting the shopping list to a remotely connected device over the Internet; and
- presenting the shopping list on the remotely connected device.

7. The food inventory system of claim 6, further comprising a charging
- station configured to be placed on a table or countertop to charge the device, the computing device operable while connected to the charging station, the charging station having a back board configured to allow the computing device to slide in to the charging station and allow the device to lean against the back board while charging, the charging station having a front board configured to secure computing device in place by covering a portion of the device, the base configured to stabilize the entire charging station to be upright.

* * * * *